US006716551B2

(12) United States Patent
Peinecke et al.

(10) Patent No.: US 6,716,551 B2
(45) Date of Patent: Apr. 6, 2004

(54) ABRADED FLUID DIFFUSION LAYER FOR AN ELECTROCHEMICAL FUEL CELL

(75) Inventors: Volker Peinecke, Esslingen (DE); Jorg von der Osten-Fabeck, Holzmaden (DE); John Robert Gordon, Vancouver (CA); Herwig Robert Haas, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 291 days.

(21) Appl. No.: 09/847,461

(22) Filed: May 2, 2001

(65) Prior Publication Data

US 2002/0192536 A1 Dec. 19, 2002

(51) Int. Cl.$^7$ .................................................. H01M 2/14
(52) U.S. Cl. .............................. 429/39; 429/30; 429/33; 429/34; 429/38; 429/40; 429/42; 429/44; 204/284; 427/115; 427/289; 427/290; 427/307
(58) Field of Search ................................. 427/115, 289, 427/290, 307; 204/282, 283, 284; 429/30, 33, 34, 38, 39, 40, 42, 44

(56) References Cited

U.S. PATENT DOCUMENTS

| 4,272,353 | A | | 6/1981 | Lawrance et al. .......... 204/283 |
|---|---|---|---|---|
| 4,732,637 | A | | 3/1988 | Dettling et al. ............. 156/295 |
| 5,763,765 | A | | 6/1998 | Lamont et al. ............... 73/40.7 |
| 5,885,729 | A | | 3/1999 | Marchetti ..................... 429/42 |
| 6,096,450 | A | * | 8/2000 | Walsh .......................... 429/34 |
| 6,103,077 | A | * | 8/2000 | DeMarinis et al. ......... 204/284 |
| 6,150,047 | A | | 11/2000 | Yen et al. ...................... 429/33 |
| 6,221,523 | B1 | * | 4/2001 | Chun et al. ................... 429/40 |
| 6,261,711 | B1 | * | 7/2001 | Matlock et al. ............... 429/34 |
| 6,403,245 | B1 | * | 6/2002 | Hunt ............................ 429/30 |
| 6,410,178 | B1 | * | 6/2002 | Matsukawa ................... 429/39 |
| 6,428,920 | B1 | * | 8/2002 | Badding et al. .............. 429/30 |
| 6,444,602 | B1 | * | 9/2002 | DeMarinis et al. ......... 204/284 |
| 6,514,400 | B1 | * | 2/2003 | Matsukawa ................. 205/649 |

FOREIGN PATENT DOCUMENTS

| JP | 2001-085019 | 3/2001 |
|---|---|---|
| WO | WO 86/06879 | 11/1986 |

* cited by examiner

*Primary Examiner*—Bruce F. Bell
(74) *Attorney, Agent, or Firm*—McAndrews, Held & Malloy, Ltd.

(57) ABSTRACT

In a method of manufacturing a fluid diffusion layer for a solid polymer electrolyte fuel cell, a surface of the fluid diffusion layer is abraded so that the topography of the fluid diffusion layer surface is rendered more uniform. The fluid diffusion layer comprises a porous substrate, and may also comprise a carbon-containing sublayer, as well as hydrophobic material. The particles formed by the abrading operation may be deposited into at least some of the pores of the substrate to form a support structure for the direct depositing of a catalyst onto the abraded surface.

41 Claims, 5 Drawing Sheets

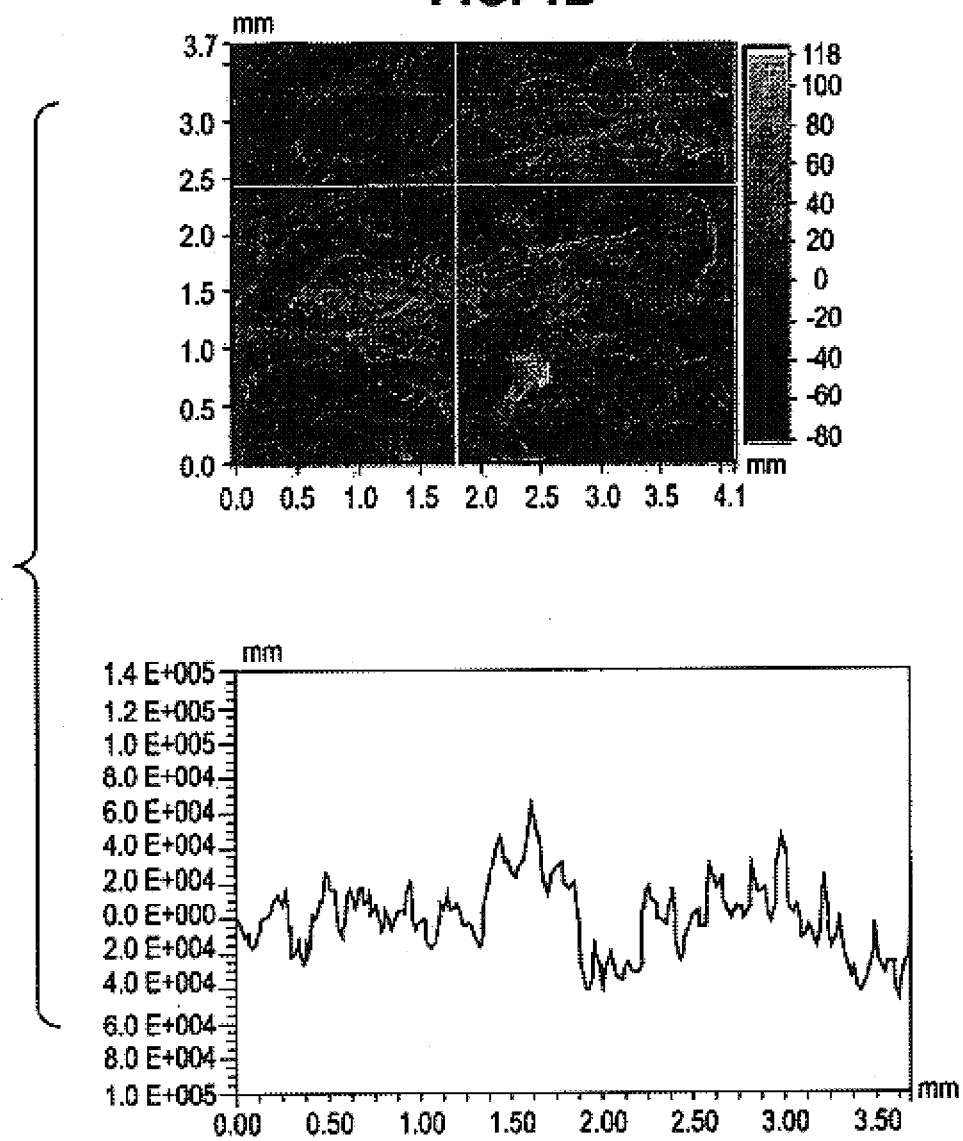

ABRADED FLUID DIFFUSION LAYER FOR AN ELECTROCHEMICAL FUEL CELL

FIELD OF THE INVENTION

The present invention relates to a fluid diffusion electrode of a solid polymer electrolyte fuel cell, and in particular to a method of abrading a surface of a fluid diffusion layer of the electrode and a product to which the method has been applied.

BACKGROUND OF THE INVENTION

Electrochemical fuel cells convert fuel and oxidant to electricity and reaction product. Solid polymer electrochemical fuel cells generally employ a membrane electrode assembly ("MEA"), which comprises an ion exchange membrane, or solid polymer electrolyte disposed between two fluid diffusion electrodes typically comprising a layer of porous, electrically conductive substrate material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit.

At the anode, the fuel stream moves through the porous anode substrate and is oxidized at the anode catalyst layer. At the cathode, the oxidant stream moves through the porous cathode substrate and is reduced at the cathode catalyst layer to form a reaction product. In fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode catalyst layer, oxygen reacts with the protons that have crossed the membrane to form water as the reaction product. The anode and cathode reactions in hydrogen/oxygen fuel cells are shown in the following equations:

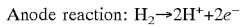

Anode reaction: $H_2 \rightarrow 2H^+ + 2e^-$

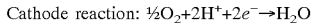

Cathode reaction: $\frac{1}{2}O_2 + 2H^+ + 2e^- \rightarrow H_2O$

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Two or more fuel cells can be electrically connected together in series to increase the overall power output of the assembly. In series arrangements, one side of a given fluid flow field or separator plate can serve as an anode plate for one cell and the other side of the fluid flow field or separator plate can serve as the cathode plate for the adjacent cell. Such a multiple fuel cell arrangement is referred to as a fuel cell stack, and is usually held together in its assembled state by tie rods and end plates.

Conventional fuel cell electrode designs typically comprise a fluid diffusion layer (FDL) and a catalyst layer. The FDL generally comprises an essentially fluid-permeable substrate, and in some cases, a sublayer disposed on one surface of the substrate for providing a base on which a catalyst layer is disposed to form an electrode. The substrate serves as a backing material and structural support for the electrode, and is typically made of an electrically conductive material such as carbon cloth, carbon paper, carbon fiber woven, or carbon fiber non-woven. A hydrophobic polymer such as polytetrafluoro-ethylene (PTFE) is typically applied to the substrate to discourage water (either generated from the electrochemical reaction or from the humidified reactant streams) from accumulating in the electrode. The PTFE-treated substrate is typically sintered so that the hydrophobic polymer melts and coats the substrate.

The sublayer, if present in the FDL, is generally concentrated at the catalyst side of the substrate. The sublayer generally comprises fibers or particles of an electrically conductive material such as carbon or graphite, and may also contain some hydrophobic material such as PTFE. Several types of high surface area carbon particles, both graphitized and non-graphitized, are available for use in the sublayer. The catalyst is typically applied to the substrate surface coated with the sublayer (although such a fluid diffusion layer could be combined with a catalyzed membrane in an MEA). Suitable catalyst materials include precious metals or noble metals such as platinum. The catalyst layer may comprise unsupported catalyst such as platinum black, or include supported catalyst in which catalyst such as platinum is supported on for example, carbon particles.

There is motivation in the fuel cell industry to improve long-term performance and reliability of MEAs while reducing their manufacturing costs. Low cost materials and simplified processing steps are desirable, but the MEA should meet minimum standards of reliability, longevity and performance. For example, the MEA materials should be selected and the MEA manufactured such that the MEA maintains membrane integrity over its designed operating life. Membrane integrity is necessary to maintain fluid isolation of the fuel and oxidant streams during fuel cell operation; a perforation in the membrane can cause reactant transfer leaks (that is, a leakage of one or more reactant through the membrane to the other electrode) which can be detrimental to fuel cell performance and can further damage the cell. Various approaches have been developed to detect membrane perforations and associated reactant transfer leaks; one such approach is described in U.S. Pat. No. 5,763,765, owned by the Ballard Power Systems Inc., the assignee of the present application. In the approach described in the '765 patent, perforations in a membrane are detected by a thermal imaging device that detects heat generated by an exothermic reaction of a pair of reactants which contact each other at a membrane perforation. The localized exothermic reaction appears as a "hotspot" in the thermal image.

SUMMARY OF THE INVENTION

A correlation has been identified between certain surface texture characteristics of the FDLs of an MEA in a solid polymer electrolyte fuel cell and the occurrence of membrane perforations and transfer leaks in operating fuel cells. Examples of such surface texture characteristics include "surface roughness" and "waviness"; in the context of this description, surface roughness relates to the finest (shortest wavelength) irregularities of a surface and waviness relates to the more widely spaced (longer wavelength) deviations of a surface from its nominal (intended) shape that cause the profile of the electrode or FDL of the electrode to vary in thickness.

In one embodiment, a method of manufacturing an FDL for a solid polymer electrolyte fuel cell comprises abrading a surface of the FDL such that the topography of the FDL surface is rendered more uniform, leading to reduced surface roughness and/or waviness. The FDL comprises at least a porous substrate and may also comprise a carbon-containing sublayer on the surface of the substrate. The sublayer provides a support layer for the deposit of catalyst on the substrate. The FDL may also comprise a hydrophobic material such as polytetrafluoroethylene (PTFE).

In the manufacture of such an FDL that does not already comprise hydrophobic material, a hydrophobic material such as PTFE may be applied to the substrate before or after the substrate is abraded. After the hydrophobic material is applied, the substrate is sintered (before or after abrading) so that the hydrophobic material melts and coats on the substrate, thereby rendering the FDL more hydrophobic. If the FDL does not already have a carbon-containing sublayer, a sublayer may be applied on the substrate before or after sintering, before or after abrading, and before or after the application of the hydrophobic material. A final sintering step may be carried out after the sublayer (and optionally, the hydrophobic material) has been applied.

The sublayer may contain, in addition to carbon, a percentage of hydrophobic material. If such a hydrophobic sublayer is applied to the substrate, a sintering treatment may be carried out to melt the hydrophobic material in the sublayer and distribute it over the substrate. Abrading the sublayer-coated substrate has been found to lead to an improvement in the uniformity of the sublayer thickness and the FDL or substrate basis weight (density), and a reduction in the number of significant protrusions on the substrate that may cause damage to an adjacent membrane.

The FDL surface is abraded with an abrading material having an average $R_a$ (average surface roughness) that is less than the average $R_a$ of the FDL prior to abrading. The abrading treatment has significant benefit for FDLs having an average $R_a$ of at least about 14 $\mu$m, and that are abraded to an average $R_a$ of between about 6 $\mu$m and 10 $\mu$m. $R_a$ is a standard surface profile parameter used in the surface finishing industry (see for example, the Surface Metrology Guide developed by Precision Instruments Inc., ASME B46.1-1995, ASME B46.1-1985, ISO 4287-1997, and ISO 4287/1-1984) and is defined as the area between the roughness profile of a surface and its mean line, or the integral of the absolute value of the roughness profile height over the evaluation length. Note that $R_a$ measures the profile of a section of a surface (i.e. is a two-dimensional measurement); in contrast, the "average $R_a$" relates to the three-dimensional topography of a surface and is the averaged value of a plurality of sectioned profiles of the surface. While $R_a$ values are one way to quantify the effects of abrading, other measurable industry standard surface profile parameters such as peak count ($P_c$) or Kurtosis ($R_{ku}$) may be employed.

An abrading treatment can also be beneficial to reduce the waviness of an FDL. Waviness can be measured by measuring the standard thickness deviation over a sectioned profile of an FDL material (and the corresponding average standard deviation over a selected surface area). The abrading treatment has significant benefit for FDLs having an average standard deviation thickness of about 28 $\mu$m, and that are abraded to an average standard deviation thickness of less than about 15 $\mu$m.

An abrading treatment is particularly effective for FDLs comprising or consisting essentially of porous substrates such as carbon fiber woven or non-woven. Such substrates tend to have a pore volume of at least about 80% and an average pore size of at least about 30 $\mu$m. For carbon fiber non-woven substrates, abrading with 320 grit sanding material has been found to be effective in reducing the average $R_a$ (or $P_c$) to desirable levels.

In another embodiment, an FDL for a solid polymer fuel cell has a surface abraded to an average $R_a$ of between 6 and 10 $\mu$m. The FDL comprises a substrate that may be a significantly porous substrate, having a substrate pore volume of at least about 80%, and an average pore size of at least about 30 $\mu$m. The substrate may be made from carbon fiber woven or non-woven material. The FDL may further comprise a carbon-containing sublayer on a surface of the substrate. An electrode may be formed by coating a catalyst on the FDL; the catalyst may be a carbon-supported catalyst. Two such electrodes interpose a solid polymer electrolyte membrane to form a membrane electrode assembly (MEA). The MEA is interposed between a pair of fluid flow plates to form a fuel cell. The fuel cell may be combined (typically in electrical series) with other fuel cells to form a fuel cell stack.

In the above embodiments, substrate and sublayer particles that are loosened as a result of the abrading operation are typically removed in a cleaning step prior to applying the catalyst coating.

In another embodiment, a sublayer-free FDL is abraded and the loosened particles are deposited into pores of the substrate such that they form part of the FDL. "Deposit" includes allowing the substrate particles to fall into the pores. The substrate may comprise hydrophobic material on its surface and in its pores; if not, a hydrophobic material may be applied to the substrate prior to abrading. The loosened particles would thus comprise abraded substrate particles as well as some abraded hydrophobic material. The hydrophobic material, either abraded as a result of abrading or still in place on the surface or in the pores of the substrate, secures the abraded substrate particles to the substrate.

The abraded substrate particles that are deposited onto the substrate preferably primarily occupy the pores of the substrate near the substrate surface ("surface pores"). The substrate may then be subjected to a post-abrading sintering step (a pre-abrading sintering step may also be carried out after the hydrophobic material is applied to the substrate). Additional hydrophobic material may optionally be applied to the substrate after abrading and before the post-abrading sintering step. The "fill" of loosened substrate particles provides a base for the catalyst layer, thereby in most cases obviating the need to apply a separate carbon containing sublayer to the substrate, thereby simplifying the FDL manufacturing process. The abrading operation also improves the uniformity of the surface topography of the substrate.

In another embodiment, an FDL for a solid polymer electrolyte fuel cell comprises a hydrophobic porous abraded substrate with deposits of abraded substrate particles in at least some of the pores of the substrate. A carbon sublayer may be applied between the substrate and the catalyst sublayer, but is generally not necessary if the loosened substrate particles occupy the surface pores of the substrate so as to provide an adequate base for the application of the catalyst. The FDL may also comprise or consist of significantly porous substrates such as carbon fiber woven or non-woven. Such substrates have a pore volume of at least about 80% and an average pore size of at least about 30 μm.

A catalyst coating may be added to a surface of this FDL to form an electrode. A pair of such electrodes interpose a solid polymer electrolyte membrane to form an MEA. The MEA is interposed between a pair of fluid flow plates to form a fuel cell. The fuel cell may be combined with other fuel cells to form a fuel cell stack.

BRIEF DESCRIPTION OF THE DRAWINGS

FIGS. 1(a), 1(b) and 1(c) are Wyko optical interferometric topographic pictures and representative surface profiles of impressions of various substrate materials under 300 psi (2068 kPa) compression, namely, a test batch of Toray H060 substrate (FIG. 1(a)), and two test batches of SGL Saracen (FIGS. 1(b) and 1(c)).

DETAILED DESCRIPTION OF PREFERRED EMBODIMENT(S)

Figure 1A:
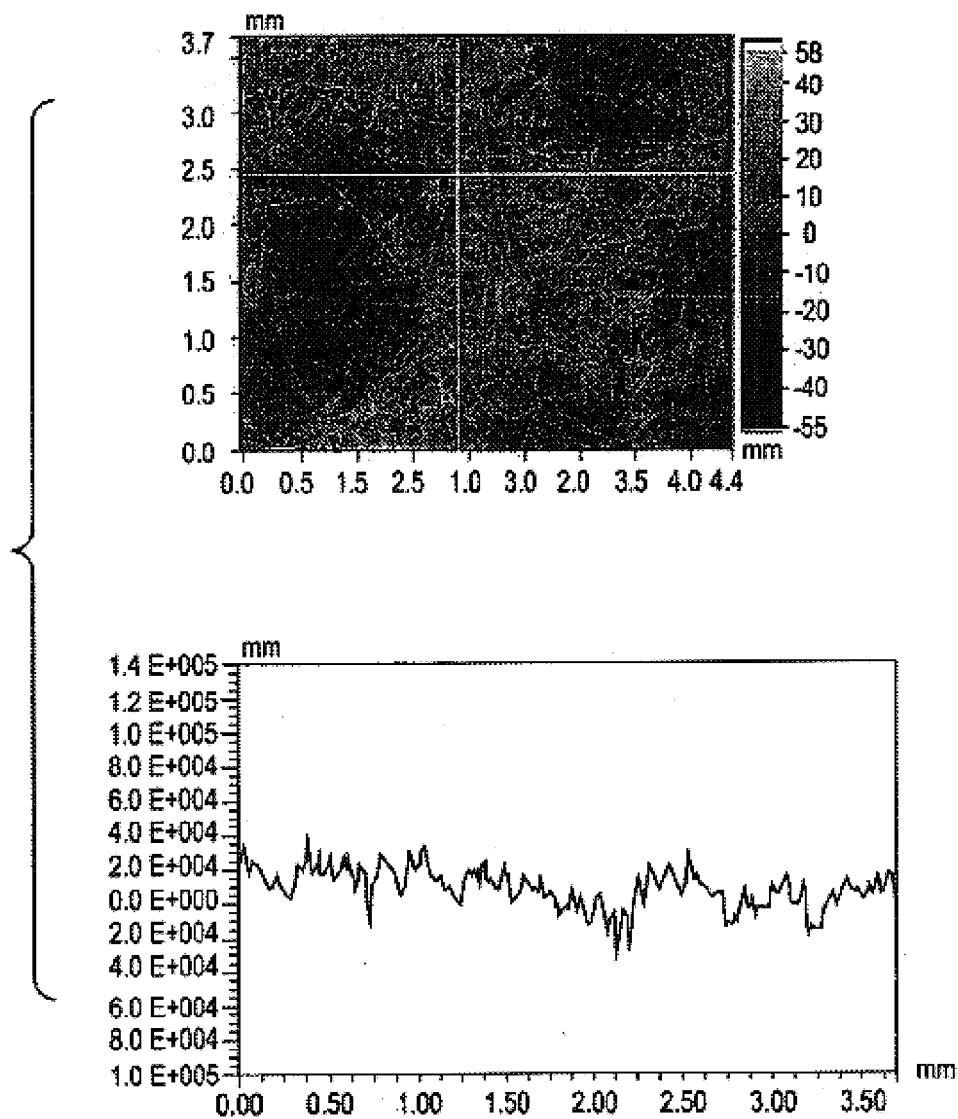

In a solid polymer electrolyte fuel cell (also known as a proton exchange membrane (PEM) fuel cell), a membrane electrode assembly (MEA) comprises an ion exchange membrane or solid polymer electrolyte disposed between two electrodes typically comprising a porous, electrically conductive substrate material, such as carbon fiber paper or carbon cloth. An example of such a commercially available carbon fiber paper is Toray H060 manufactured by the Toray Group U.S.A.

Other suitable substrates include carbon-fiber non-woven, and woven substrates. These substrates typically have a porosity and/or pore size greater than the traditional class of carbon fiber paper substrates exemplified by the Toray H060. Such "significantly porous substrates" typically have a pore volume greater than about 80%, and an average pore size greater than about 30 μm. Visible pores can usually be observed by the naked eye. Commercially available examples of a significantly porous substrate are SiGRACET™ non-woven carbon fiber manufactured by the SGL Carbon Group, and substrates available from Mitsubishi Rayon Corp. (MRC), and Freudenberg Non Wovens Group.

The SGL substrate has a relatively rough surface, large pores, large basis weight (density) variation, and high waviness as compared to the Toray H060 substrate. Test batches of the Toray (one test batch) and SGL substrates (two test batches) in uncompressed and compressed states (to simulate bonding or stack compression conditions) were examined using a three-dimensional optical surface imaging technique using a Wyko NT2000 3-D Optical Profiler apparatus. The Wyko apparatus is a non-contact optical phase-shift interferometric profiler that calculates various surface profile parameters of a surface, including the average $R_a$ value. The Wyko apparatus was used to measure an average $R_a$ value of one or more 0.5 cm² portions of a substrate, FDL or electrode surface or of a substrate, FDL or electrode impression on a compressible material. The surface profile was measured in the cross-direction of any observed fiber orientation of the substrate. Stylus profilers can also be used; however, they usually record a lower average $R_a$ value as their pore resolution tends to be lower. The surface roughness of the measured portion is considered to be indicative of the average $R_a$ of the entire substrate/FDL/electrode; variations of only about 2 μm were found between measured portions of the same material.

From the examined test specimens, the SGL substrate was found to have an average $R_a$ greater than Toray by about 100–140%. An electrode having a SGL substrate that was compressed at 300 pounds per square inch (2068 kPa) was found to have $R_a$ surface values about 170% greater than a similarly compressed electrode having a Toray substrate. Surface peaks as high as 115 μm were observed in the SGL substrates; these peaks were usually tangled clumps of fiber and binder. The following table provides an overview of the measured substrates and their $R_a$ values:

TABLE 1

| | Toray H060 | Toray bi-layer coated cathode | SGL (batch 1) | SGL (batch 2) | SGL coated anode |
|---|---|---|---|---|---|
| $R_a$ (μm), no compression | 14.4 | 6.1 | 26 | 32 | 17.8 |
| $R_a$ (μm), 300 psi (2068 kPa) compression | 10.6 | 6.2 | 17 | 19 | 16.9 |

Figure 1C:
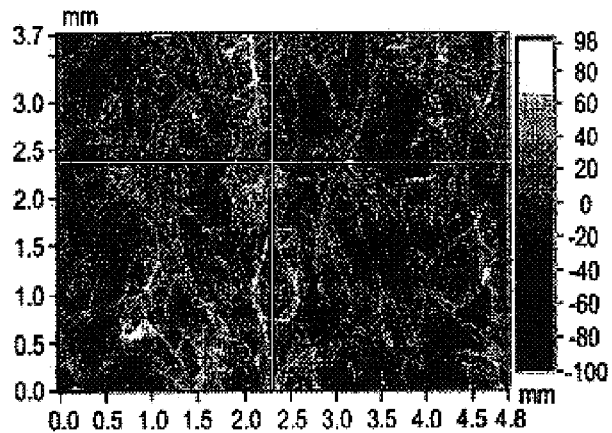
Figure 1C:
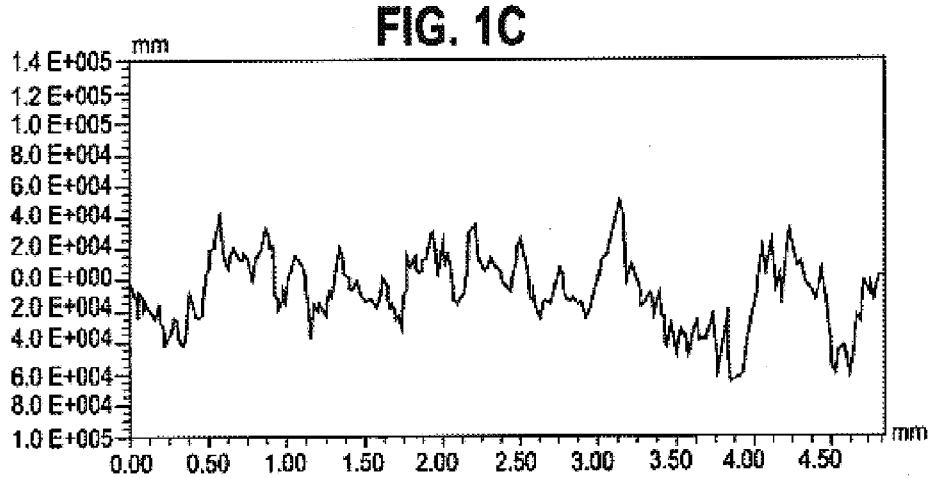

Referring to FIG. 1, the Toray substrate (FIG. 1(a)) has a relatively uniform surface texture with small pores between fibers. In contrast, the two batches of SGL substrate (FIGS. 1(b) and (c)) have some deep narrow pores like the Toray as well as larger pores and more frequent surface texture deviations.

Coating the smaller pored, less rough Toray substrate with a carbon-containing sublayer and catalyst ("bi-layer coat") resulted in a significantly smoother surface. In contrast, there was a less significant decrease in the roughness of the SGL substrate after it was coated. The greater relative average $R_a$ decrease in the Toray is theorized to be caused in part by the greater ability of the carbon sublayer and catalyst to coat the surface and fill the pores of the substrate; in contrast, the sublayer coatings may not fill the larger pores of the SGL as effectively as those of the Toray substrate. Coating the SGL substrate does not appear to significantly reduce average surface roughness under pressure; it appeared that parts of the substrate may have broken through the coating during compression. In contrast, it appeared the carbon and catalyst sublayers in the Toray substrate still maintained their integrity during bonding conditions and under stack compression. It appeared that the smaller pores and more uniform basis weight of the Toray substrate enabled the coating to maintain its integrity under pressure.

During operational testing of MEAs incorporating these substrates, both the Toray and SGL substrates containing MEAs exhibited occurrences of reactant transfer leaks, that is, leakage of reactant from one side of the membrane to the other. Such transfer leaks were found to be more frequent in MEAs having a rougher substrates (higher average $R_a$ values). Transfer leaks were identified as hotspots using an infrared (IR) camera technique. Examination of these MEAs suggests a correlation between IR hotspots and fluid diffusion layer surface effects and in particular, surface effects caused by a rough surface topography and substrate thickness variations. In particular, examinations revealed a correlation between the number of IR hotspots and the magnitude and frequency of peaks and depressions on the substrate surface.

It is postulated that the observed IR hotspots may be caused by two membrane thinning mechanisms that occur especially during bonding of the constituent elements of the MEA, and possibly also during fuel cell stack operation under compression. Peaks in the substrate surface may cause transfer leaks by penetrating the membrane. Pores or depressions may cause transfer leaks as heat and compressive stresses cause the membrane to deflect into pores and other surface depressions.

Peaks and other surface effects can lead to membrane damage in the MEA. The surface effects may cause perforations in the membrane that allow reactant to cross over to the other electrode. Fuel and oxidant will then combust and produce localized heat. The localized heat may degrade the MEA further until performance is reduced. Perforations in the membrane allowing anode and cathode contact can also cause localized heating as well as increase electrode overpotentials, which can also degrade the MEA further until fuel cell performance is reduced.

The waviness of an electrode affects the electrode's porosity and/or basis weight. All other properties being equal, variations in substrate thickness (whether or not with an associated higher basis weight) will generally change the amounts of reactant and water diffusion to the catalyst and the extraction rate of product water. This will generally change the localized cell overpotential (at the associated area of the anode and cathode), and will thus change the voltage. Thus, a variation in electrode thickness can increase stack cell-to-cell and within-cell voltage variability. This will reduce the ability of the stack to be optimized for any one or combination of reactant stoichiometries, pressures, and temperatures. As a result, total stack power output available at any given operating condition could be reduced.

Ten SGL substrate sheets were subjected to various treatments designed to affect the roughness of the substrate sheet surface. Treatments included abrading the substrate sheet with sandpaper, applying pressure to compact the substrate sheet before applying the sublayer coating and catalyst material, and varying the amount of sublayer coating applied to each sheet. The $R_a$ of each substrate sheet was then measured. Anode and cathode layers were then formed from each sheet, which were then bonded with a membrane to form an MEA. A scanning electron microscope was then used to determine the standard deviation thickness variation of the membrane in the MEA (the membrane surface topography tends to conform to the anode and cathode surface topography after bonding). A fuel cell was then assembled for each MEA and operated. The operation of each fuel cell was monitored using a thermal imaging device; the number of "hotspots" observed by the imaging device was then recorded and compared to the average anode and cathode $R_a$ and membrane thickness variation measured for each MEA.

Figure 2:
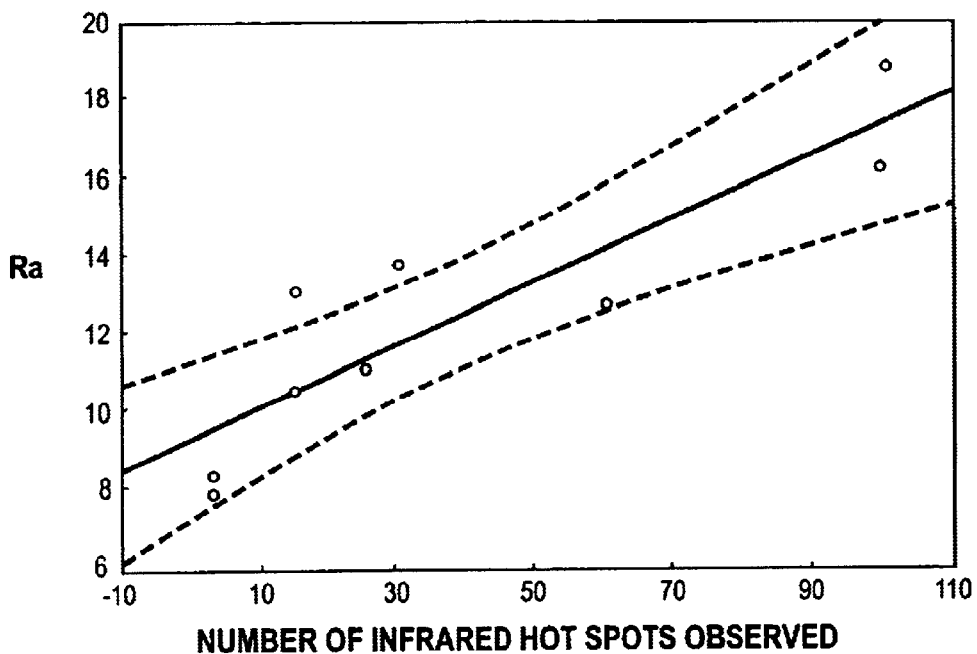
FIG. 2 is a graph illustrating a relationship between average surface roughness of an electrode of an MEA and the observed number of infrared "hot-spots" in the MEA under a thermal imaging device.
Figure 3:
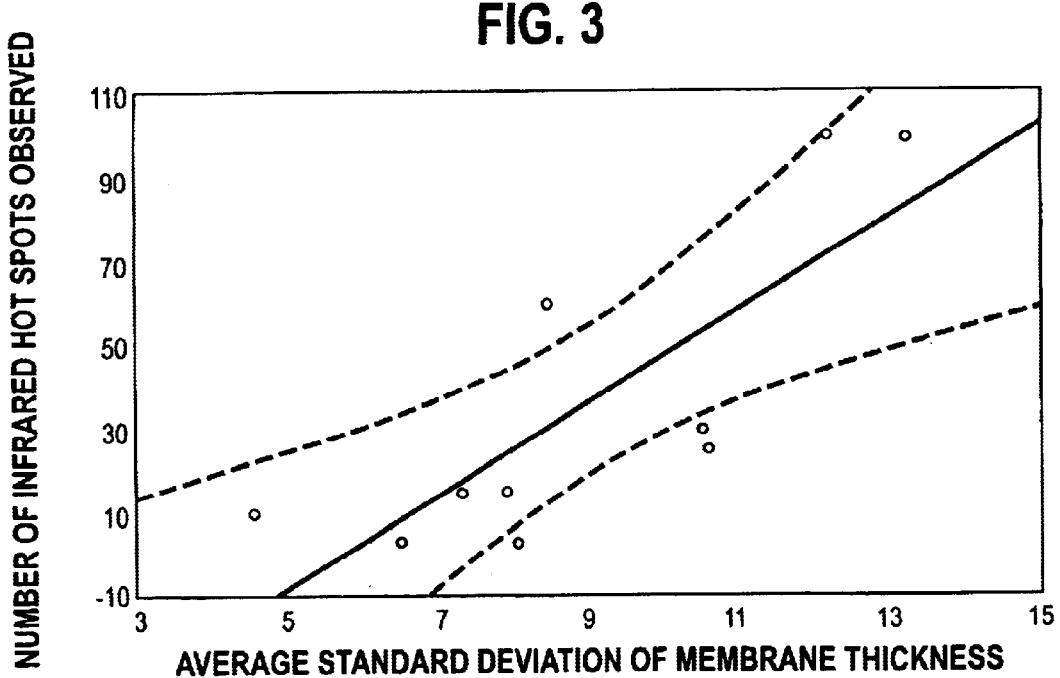
FIG. 3 is a graph illustrating a relationship between membrane thickness of an MEA and the observed number of infrared hotspots in the MEA under a thermal imaging device.

FIG. 2 is a graph plotting the average $R_a$ (Y axis) against IR hot spots (X axis) measured for each fuel cell (one plot point appeared to be an anomaly and is not included in FIG. 2). As shown in this graph, the observed number of hotspots in a fuel cell tends to increase with an increase in the average $R_a$ of the substrates in that fuel cell. Other parameters such as those measuring valley or pore depth as well as also those that measure peak count suggested a correlation with membrane damage in the MEA and corresponding IR hotspots. FIG. 3 illustrates a correlation between the membrane thickness variation and IR hotspots measured for each fuel cell. As shown in this graph, the number of hotspots tends to increase with an increase in the standard deviation of membrane thickness.

It is theorized that reducing one or more of FDL average surface roughness (Ra), average peak height, average peak count, and the average variation of substrate thickness (waviness) reduces the frequency of membrane damage and thus improve the reliability and performance of the MEA. To test this theory, a SiGRACET™ GDL substrate from SGL was pre-treated by soaking in a diluted solution of DuPont polytetrafluoroethylene (PTFE) homopolymer Product 30B for 60 seconds, then allowed to dry overnight at ambient room conditions, allowing about 0.6 mg/cm$^2$ PTFE in the substrate. The coating material consisted of an emulsified mixture of (by solids weight) 37% A99 Graphite from Asbury, 37% Shawinigan Carbon from Chevron, 13% DuPont Polytetrafluoroethylene (PTFE) homopolymer Product 30B and 13% Methyl-cellulose from Sigma Aldrich. Solids content of the coating material was 15% (by weight). The substrate was coated on a RK-Print Coat K-coater with a blade gap 18 thousandths of an inch. A sheet of Vitafilm was then laid on to the coated surface, a blotter paper supported the back surface, and the assembly was then compacted at 50 psi for 30 seconds. The Vitafilm was immediately removed and the coated substrate was then allowed to dry overnight at ambient room conditions. The dry coated surface was then abraded with 320 grit wet/dry sandpaper with a Richard (Canada) No. 32 10 cm by 9 cm 200 g hand-sanding block. Abrading consisted of approximately 12 back and forth motions in one direction, then switching direction by 45 degrees and repeating the back and forth motions about 10 times. Little pressure other than the weight of the sanding block was applied. After abrading, loose material was removed. The coated substrate was sintered at 400° C. for a minimum of 10 minutes to complete the FDL.

Figure 4:
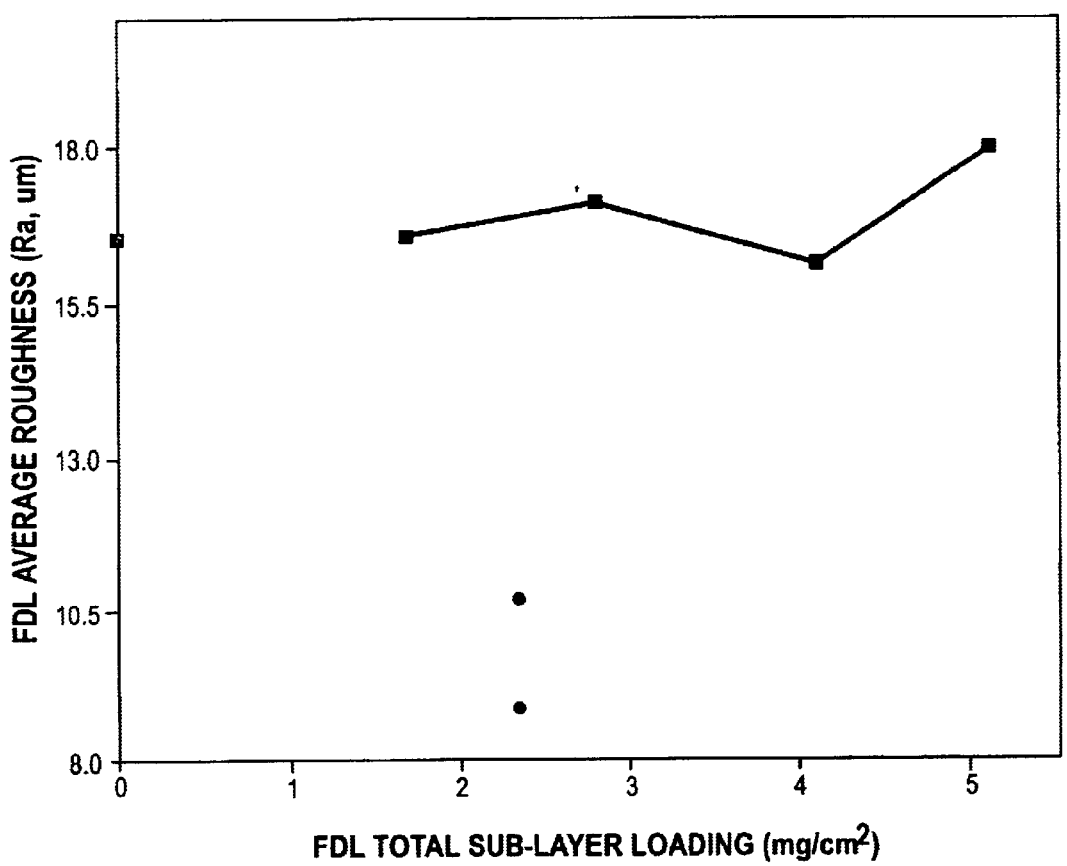
FIG. 4 is graph illustrating a relationship between the average surface roughness of an FDL before and after abrading, for a given sublayer loading.

Two FDLs each coated with about 2.3 mg/cm$^2$ of sublayer were abraded according to the method described above. Referring to FIG. 4, the average $R_a$ for each FDL was measured (plotted as ● on graph) and compared to the $R_a$ of conventional non-abraded FDLs of varying sublayer fill loads (plotted as ■ on graph). The variation in $R_a$ between the two abraded FDLs are within the expected experimental error ranges. It can be seen that the abrading operation appreciably reduced the average $R_a$ of the abraded substrate. The abrading treatment can assist in removing irregularities protruding from the substrate surface, such as fiber clusters. MEA reliability should be increased because the abrading treatment of the FDL modifies the surface effects that can lead to membrane damage, and reduces the thickness variations in the electrode and MEA. The abrading treatment reduces the overall thickness of the FDL, which improves MEA performance by increasing the power density of the MEA. Performance is also increased by allowing a reduction in the sublayer loading while maintaining lower surface roughness. That is, a more uniform substrate or FDL surface texture allows for less basis weight variation in the sublayer and catalyst coatings.

Although a 320 grit sanding material was used in the above described examples, abrading materials having other grit values may be selected depending on the roughness of the FDL. Generally, the abrading material should be less coarse (have a lower Ra) than the FDL to be abraded so that the FDL is smoothed and not roughened. The abraded FDL is preferably abraded to an average surface roughness $R_a$ of about 6–10 μm to provide the best balance between performance, reduced transfer leaks, and reliability. Abrading to less than about 6 μm is expected to further reduce the occurrence of transfer leaks, but care should be applied to avoid reducing the thickness of the substrate to such an extent that mechanical integrity is compromised. It has been found that FDLs having an average surface roughness $R_a$ of at least about 14 μm experience the greatest benefit from the abrading treatment.

Various commercially available abrading machines may be adapted and installed in a continuous process for manufacturing FDLs having a surface abraded according to the methods described above. Suitable abrading machines may include a drum sander, widebelt sander, sanding roll, polishing roll, or polishing platten so long as they are able to abrade the FDL or substrate to an acceptable tolerance, which in the above described cases is about 6–10 μm. For example, a Timesavers® series 200 World Plus veneer polisher may be adapted to perform the abrading operation.

After the carbon sublayer has been applied to the substrate to form the FDL and depending on the degree of abrading that was carried out, the FDL may be sprayed by a wetting agent such as isopropyl alcohol (IPA) to promote coating of a catalyst to the FDL. The catalyst coating is applied to the FDL before the IPA has completely evaporated. The catalyst coating may comprise unsupported catalyst particles such as platinum black, or supported catalyst such as carbon-supported platinum. The abrading treatment tends to reduce (or eliminate altogether) the quantity of IPA needed to be sprayed on the abraded FDL relative to conventional non-abraded FDLs. The abrading removes some or all of the hydrophobic material from the top surface portions of the FDL, (hydrophobic material continues to adhere to the FDL within the substrate pores), thereby reducing the hydrophobicity at the top surface portions of the FDL. As the hydrophobic material tends to impede effective bonding of the catalyst to the FDL (hence the need for a wetting agent), the reduction of such material at the top surface of the FDL enables the catalyst to adhere to the FDL with less or no wetting agent.

In another embodiment, a sublayer-free substrate is abraded and the loosened abraded particles are not removed after the substrate has been abraded, but are instead allowed to fall into or are deposited into pores of the substrate. In other words, an FDL is manufactured having a substrate with pores that are filled or partially filled with substrate particles that have been abraded as a result of the abrading operation. In preferred embodiments, an FDL is manufactured according to the following steps:

(a) Applying a hydrophobic material such as PTFE to a carbon-fiber substrate; a suitable such substrate is Toray carbon fiber paper having a thickness of about 180 μm. Alternatively, the substrate may be a woven or non-woven carbon fiber material.

(b) Sintering the PTFE-coated substrate (optional).

(c) Applying an abrading treatment (as described above) to reduce the thickness of the treated Toray paper preferably by about 30–40 μm. The abraded material comprises carbon particles or fibers of varying lengths coated with the PTFE. These loosened particles are allowed to fall into or are deposited into pores of the abraded substrate. The abraded material tends to adhere to the surface pores of the substrate due to the PTFE coating on the substrate.

(d) Sintering the substrate again to secure the abraded particles inside the pores of the substrate. Additional PTFE (or another suitable hydrophobic material) may be added before this final sintering step.

(e) Applying a second abrading treatment to the electrode to reduce contact resistance (optional).

(f) Applying a catalyst coating comprising supported or unsupported catalyst material (to prepare an electrode incorporating the FDL).

The abrading treatment improves the uniformity of the surface topography of the substrate. In this regard, by reducing the average $R_a$ of the substrate surface and the variations in the substrate thickness, the occurrence of transfer leaks in MEAs incorporating the substrate is reduced. Because the surface pores of the substrate have been filled or partially filled with carbon/PTFE particles, the catalyst particles will generally adhere adequately to the substrate separate support sublayer. By eliminating the sublayer coating process (which typically includes screen-printing the sublayer onto the substrate surface, allowing it to dry, then sintering the coated substrate), the manufacturing of a fuel cell electrode is simplified and quickened, resulting in reducing manufacturing costs, and improved efficiency.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of manufacturing a fluid diffusion layer for a solid polymer electrolyte fuel cell, said fluid diffusion layer comprising a porous substrate having a surface topography, said method comprising abrading a surface of said fluid diffusion layer such that the uniformity of said surface topography is rendered more uniform.

2. The method of claim 1 further comprising applying a carbon-containing sublayer to a surface of said substrate.

3. The method of claim 2 wherein said sublayer is applied to said substrate surface before abrading.

4. The method of claim 2 further comprising applying a hydrophobic material to said substrate.

5. The method of claim 4 further comprising sintering said substrate after said hydrophobic material has been applied.

6. The method of claim 2 wherein said sublayer comprises a hydrophobic material.

7. The method of claim 1 wherein said fluid diffusion layer further comprises a carbon-containing sublayer on a surface of said substrate.

8. The method of claim 6 wherein said fluid diffusion layer further comprises a hydrophobic material.

9. The method of claim 8 wherein said hydrophobic material is polytetrafluoroethylene.

10. The method of claim 1 further comprising applying a hydrophobic material to said substrate.

11. The method of claim 10 wherein said hydrophobic material is polytetraflouroethylene.

12. The method of claim 10 further comprising sintering said substrate after said hydrophobic material has been applied.

13. The method of claim 1 wherein said fluid diffusion layer surface is abraded with an abrading material having an average $R_a$ that is less than the average $R_a$ of said fluid diffusion layer prior to abrading.

14. The method of claim 1 wherein the average $R_a$ of said fluid diffusion layer prior to abrading is at least about 14 μm.

15. The method of claim 14 wherein the average $R_a$ of said fluid diffusion layer after abrading is about 6–10 μm.

16. The method of claim 1 wherein said substrate has a pore volume greater than about 80% and an average pore size greater than about 30 μm.

17. The method of claim 16 wherein said substrate comprises a non-woven carbon fiber material.

18. A method of manufacturing an electrode for a solid polymer electrolyte fuel cell, said method comprising applying a carbon-supported catalyst to a fluid diffusion layer comprising a porous substrate having a surface topography, said fluid diffusion layer manufactured by a method comprising (a) abrading a surface of said fluid diffusion layer such that the uniformity of said surface topography is rendered more uniform and (b) applying a carbon-containing sublayer to a surface of said substrate.

19. A method of manufacturing a fluid diffusion layer for a solid polymer electrolyte fuel cell, said fluid diffusion layer comprising a porous substrate having a surface, said method comprising:

(a) abrading the said substrate surface such that abraded substrate particles are formed, and (b) depositing said abraded substrate particles into the pores of said substrate.

20. The method of claim 19 further comprising applying a hydrophobic material to said substrate prior to step (a).

21. The method of claim 20 further comprising sintering said substrate after said hydrophobic material has been applied.

22. The method of claim 20 further comprising, after step (b), applying additional hydrophobic material to said substrate and then sintering said substrate.

23. The method of claim 19 wherein said substrate further comprises a hydrophobic material.

24. The method of claim 19 wherein said abraded substrate particles primarily occupy the surface pores of said abraded substrate.

25. The method of claim 19 wherein said substrate has a surface topography and wherein said substrate abrading a surface of said fluid diffusion layer is abraded such that the uniformity of said surface topography is rendered more uniform.

26. The method of claim 19 wherein said substrate has a pore volume greater than about 80% and an average pore size greater than about 30 μm.

27. The method of claim 26 wherein said substrate comprises a non-woven carbon fiber material.

28. A fluid diffusion layer for a solid polymer electrolyte fuel cell, said fluid diffusion layer comprising a porous substrate having a surface abraded to an average surface roughness $R_a$ of about 6–10 μm.

29. An electrode comprising the fluid diffusion layer of claim 28 and a catalyst disposed on the surface of said fluid diffusion layer.

30. A fuel cell comprising a pair of fluid flow plates interposing a membrane electrode assembly, said membrane electrode assembly comprising a pair of electrodes interposing an ion exchange membrane, at least one of said electrodes comprising the fluid diffusion layer of claim 28.

31. A fuel cell stack comprising at least one fuel cell of claim 30.

32. The fluid diffusion layer of claim 28 wherein said substrate has a pore volume greater than about 80% and an average pore size greater than about 30 μm.

33. The fluid diffusion layer of claim 32 further comprising a carbon-containing sublayer disposed on a surface of said substrate.

34. The fluid diffusion layer of claim 28 wherein said substrate is made from a non-woven carbon fiber material.

35. A fluid diffusion layer for a solid polymer electrolyte fuel cell, said fluid diffusion layer comprising a hydrophobic porous abraded substrate having abraded substrate particles disposed in at least some of the pores of said substrate.

36. A fuel cell comprising a pair of fluid flow plates interposing a membrane electrode assembly, said membrane electrode assembly comprising a pair of electrodes interposing an ion exchange membrane, at least one of said electrodes comprising the fluid diffusion layer of claim 35.

37. A fuel cell stack comprising at least one fuel cell of claim 36.

38. An electrode comprising the fluid diffusion layer of claim 35 and a catalyst layer disposed on said substrate.

39. The fluid diffusion layer of claim 38 wherein said substrate comprises a non-woven carbon fiber material.

40. The fluid diffusion layer of claim 35 wherein said abraded substrate particles primarily occupy the surface pores of said substrate.

41. The fluid diffusion layer of claim 40 wherein said substrate has a pore volume greater than about 80% and an average pore size greater than about 30 μm.

* * * * *